(12) United States Patent
Hudecek et al.

(10) Patent No.: US 11,841,708 B2
(45) Date of Patent: Dec. 12, 2023

(54) SYSTEM AND METHOD FOR ADJUSTING A PLANNED TRAJECTORY OF AN AUTONOMOUS VEHICLE

(71) Applicant: Zoox, Inc., Foster City, CA (US)

(72) Inventors: Janek Hudecek, Redwood City, CA (US); Marin Kobilarov, Mountain View, CA (US); Jack Riley, San Francisco, CA (US)

(73) Assignee: Zoox, Inc., Foster City, CA (US)

( * ) Notice: Subject to any disclaimer, the term of this patent is extended or adjusted under 35 U.S.C. 154(b) by 413 days.

(21) Appl. No.: 16/805,118

(22) Filed: Feb. 28, 2020

(65) Prior Publication Data
US 2021/0271251 A1  Sep. 2, 2021

(51) Int. Cl.
*G05D 1/02* (2020.01)
*G05D 1/00* (2006.01)
*B60W 60/00* (2020.01)

(52) U.S. Cl.
CPC ......... *G05D 1/0217* (2013.01); *B60W 60/001* (2020.02); *G05D 1/0088* (2013.01); *B60W 2520/10* (2013.01); *B60W 2520/105* (2013.01)

(58) Field of Classification Search
CPC ............... G05D 1/0217; G05D 1/0088; G05D 2201/0213; G05D 1/0212; B60W 60/001; B60W 2520/10; B60W 2520/105; B60W 30/085; B60W 30/18163; B60W 60/0015; B60W 2420/42; B60W 2420/52; B60W 40/06; B60W 40/072; B60W 40/076
USPC .................... 701/26, 514; 704/245; 707/737; 342/25 B, 159
See application file for complete search history.

(56) References Cited

U.S. PATENT DOCUMENTS

| 9,120,485 | B1 * | 9/2015 | Dolgov | G05D 1/0217 |
| 2012/0158247 | A1 * | 6/2012 | Norris | B62D 1/28 |
| | | | | 701/44 |
| 2015/0224992 | A1 * | 8/2015 | Dornieden | B60W 30/143 |

(Continued)

FOREIGN PATENT DOCUMENTS

| DE | 102019126631 A1 * | 4/2021 |
| GB | 2570887 A | 8/2019 |

(Continued)

OTHER PUBLICATIONS

The PCT Search Report and Written Opinion dated Jun. 24, 2021, for PCT Application No. PCT/US2021/017182, 9 pages.

*Primary Examiner* — Elaine Gort
*Assistant Examiner* — Ellis B. Ramirez
(74) *Attorney, Agent, or Firm* — Lee & Hayes, P.C.

(57) ABSTRACT

Techniques for compensating for errors in position of a vehicle are discussed herein. In some cases, a discrepancy may exist between a measured state of the vehicle and a desired state as determined by a system of the vehicle. Techniques and methods for a planning architecture of an autonomous vehicle that is able to provide maintain a smooth trajectory as the vehicle follows a planned path or route. In some cases, a planning architecture of the autonomous vehicle may compensate for differences between an estimated state and a planned path without the use of a separate system. In this example process, the planning architecture may include a mission planning system, a decision system, and a tracking system that together output a trajectory for a drive system.

20 Claims, 6 Drawing Sheets

(56) References Cited

U.S. PATENT DOCUMENTS

| | | | |
|---|---|---|---|
| 2015/0345959 A1* | 12/2015 | Meuleau | B60W 30/18145 |
| | | | 701/23 |
| 2018/0024562 A1* | 1/2018 | Bellaiche | G06T 7/74 |
| 2018/0043934 A1* | 2/2018 | Okawa | G05D 1/0246 |
| 2018/0350391 A1 | 12/2018 | Moore et al. | |
| 2019/0063943 A1* | 2/2019 | Sunil Kumar | G01C 21/367 |
| 2019/0196485 A1* | 6/2019 | Li | G08G 1/00 |
| 2019/0222736 A1* | 7/2019 | Wheeler | H04N 13/106 |
| 2019/0235505 A1* | 8/2019 | Li | G05D 1/0212 |
| 2019/0301873 A1* | 10/2019 | Prasser | G01C 21/32 |
| 2019/0361450 A1 | 11/2019 | Sheckells et al. | |
| 2020/0103236 A1* | 4/2020 | Adams | G01C 21/32 |
| 2020/0240794 A1* | 7/2020 | Prasser | G05D 1/0088 |
| 2020/0339152 A1* | 10/2020 | Inoue | B60W 60/0015 |

FOREIGN PATENT DOCUMENTS

| | | | | |
|---|---|---|---|---|
| WO | WO2019236790 A1 | | 12/2019 | |
| WO | WO-2020126338 A1 | * | 6/2020 | B60W 50/0225 |

* cited by examiner

SYSTEM AND METHOD FOR ADJUSTING A PLANNED TRAJECTORY OF AN AUTONOMOUS VEHICLE

BACKGROUND

Planning and navigation systems for an autonomous vehicle often have to correct for discrepancies between a planned path and a physical position of the vehicle. For example, as the estimated physical position is an estimate of the actual physical position, some error or discrepancies in position can occur during operations. Thus, the vehicle must often correct for the error by realigning with the planned path while still maintaining a smooth ride for the passages free from irregular or sporadic changes of direction.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

DETAILED DESCRIPTION

Figure 1:
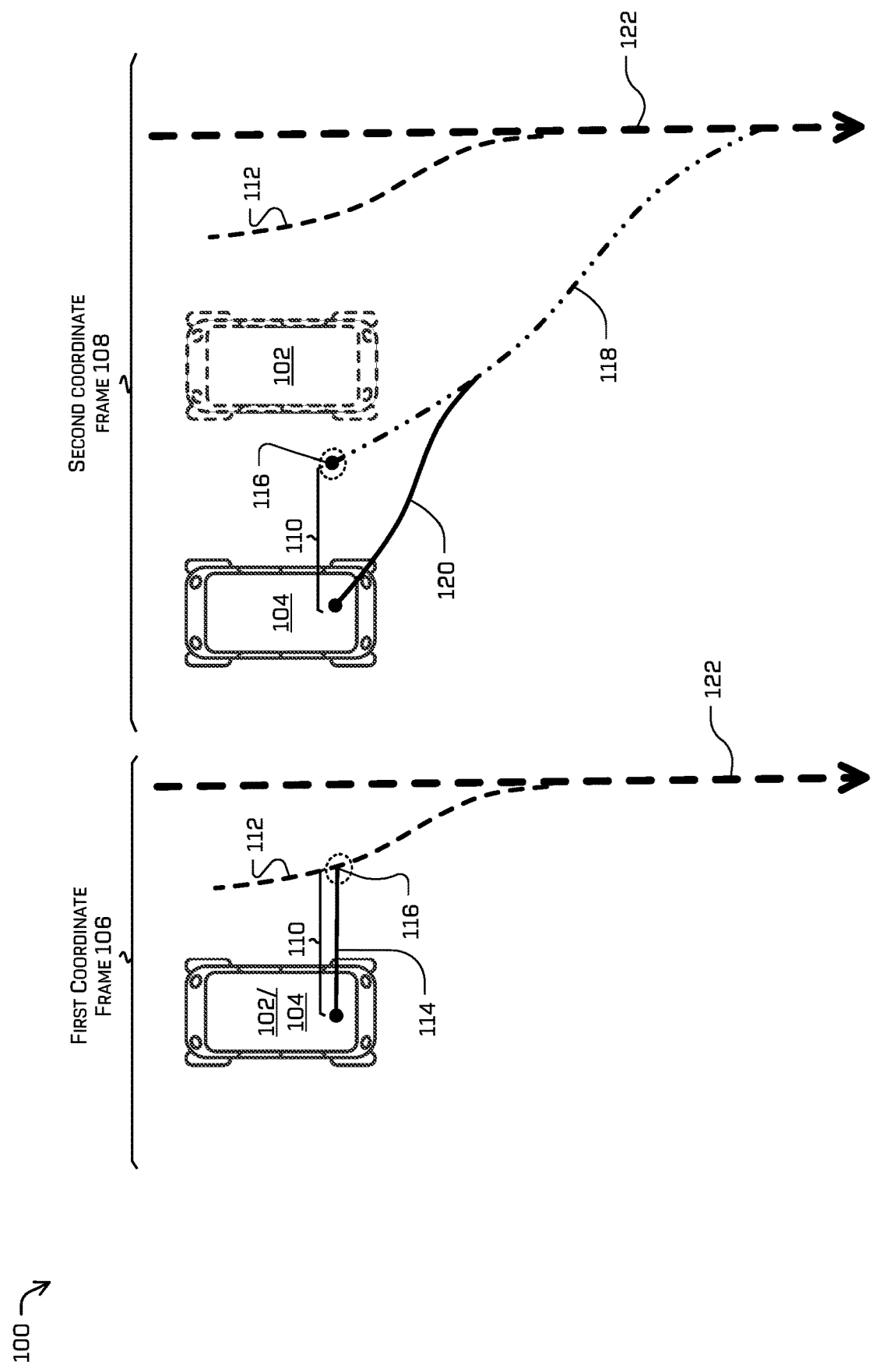
FIG. 1 is an example pictorial diagram illustrating transformations associated with planning architectures, as described herein.

Techniques and methods described herein are directed to a planning architecture of an autonomous vehicle that is able to provide and maintain a smooth trajectory as the vehicle follows a planned path or route. In some implementations, the autonomous vehicle may operate using two coordinate frames. The first coordinate frame may be relative to the vehicle (e.g., a vehicle body-centric coordinate frame), such that a position of the vehicle in the first coordinate frame remains substantially smooth or stable as the vehicle traverses the planned route. The vehicle may also maintain a second coordinate frame that is based on a location of the vehicle on the surface of the Earth (e.g., a Euclidian coordinate frame), such as Universal Transverse Mercator (UTM) coordinate frame or a longitudinal/latitudinal coordinate frame. Although discussed herein with respect to such body-centric and Euclidian coordinate frames, the disclosure is not meant to be so limiting and any combination of one or more coordinate systems (including a same coordinate system) is contemplated.

In an example process, the planning architecture of the autonomous vehicle may compensate for differences between an estimated state and a planned path without the use of a separate system. In this example process, the planning architecture may include a mission planning system, a decision system, and a tracking system that together output a trajectory for a drive system. In general, the mission planning system may generate a planned route of the vehicle from a first location to a second location. The decision system may maintain, adjust, or generate planned trajectories of the vehicle based on the planned route and the estimated state or position of the vehicle and taking into account any objects that may be proximate to the vehicle, and the tracking system may generate correction trajectories to compensate for variances between the planned route and the planned trajectory (e.g., to assist with keeping the vehicle on the planned trajectory). In some cases, the example process may also include projecting the estimated state onto the planned trajectory within the first (e.g., body-centric) frame and then converting the projected state or position into the second (e.g., Euclidian) coordinate frame prior to the tracking system generating the correction trajectory.

To provide an illustrative example of a difference in estimated state or position, assume an autonomous vehicle may be initially at an estimated position of (0, 0) within the first coordinate frame and at an estimated position of (100, 100) in the second coordinate frame. In this illustrative example, the previous planning decision may include a planned trajectory that starts at (0, 0) in the first coordinate frame and at (100, 100) in the second frame, such that there is zero distance between the position of the vehicle and the decision trajectory (e.g., both are at (0, 0) first coordinate frame and (100, 100) second coordinate frame during the first period of time.

In this example, the estimated state of the vehicle received from the position sensors is at (99, 100) in second coordinate frame, e.g., the estimated state is 1 unit of measure different than the expected state or position. Thus, the vehicle, either due to error in the position sensor or drift by the vehicle (and/or any associated algorithms), is no longer along the planned trajectory or the planned route.

As the vehicle receives the estimated state, the vehicle may project, in the first coordinate frame, the estimated state onto the previous planned trajectory to determine a projected state or position along the previous planned trajectory. In some examples, the vehicle may first convert the estimated state, which is received in the second coordinate frame, into the first coordinate frame. However, it should be understood, since the first coordinate frame is relative to the vehicle (e.g., body-centric), both the expected state and the estimated state of the vehicle are the same.

In some cases, such as the current example, the projected state may be a distance from the estimated position of the vehicle. The projected state may be transformed into the second coordinate frame using transformations determined with respect to the state of the vehicle during a previous period of time and a new planned trajectory may be determined using the projected state and the planned route. The estimated state and the new planned trajectory may be provided to the tracking system. The tracking system may then generate a correction trajectory to further compensate for any discrepancies between the estimated state and the newly planned trajectory, as well as to compensate for any detected nearby objects.

The techniques described herein can be implemented in a number of ways. Example implementations are provided below with reference to the following figures. Although discussed in the context of an autonomous vehicle, the methods, apparatuses, and systems described herein can be applied to a variety of systems (e.g., a sensor system or a robotic platform), and are not limited to autonomous vehicles. In one example, similar techniques may be utilized in driver-controlled vehicles in which such a system may provide an indication of whether it is safe to perform various maneuvers. In another example, the techniques can be utilized in a manufacturing assembly line context, in an aerial surveying context, or in a nautical context. Additionally, the techniques described herein can be used with real data (e.g., captured using sensor(s)), simulated data (e.g., generated by a simulator), or any combination of the two.

FIG. 1 is an example pictorial diagram 100 illustrating transformations associated with a planning architecture, as described herein. In the current example, the vehicle may have an expected state or position 102 and a position system of the vehicle may return an estimated state 104. In the illustrated example, both the expected state or position 102 and the estimate state or position 104 are shown in both a first coordinate frame 106 (e.g., a body centric coordinate frame) and a second coordinate frame 108 (e.g., a Euclidian coordinate frame). Similar to the example provided above, in the illustrated example, it should be noted that the expected state 102 and the estimated state 104 in the first coordinate frame are the same as the coordinate frame is relative to a position of the vehicle.

In the current example, the vehicle has a planned route 122 from a planning system and a previously planned trajectory 112 from a decision system. As shown, the expected state 102 differs from the previously planned trajectory 112 by a first distance and the estimated state 104 differs from the expected state 102 by an additional or second distance.

In this example, the estimated state 104 and the previously planned trajectory 112 are transformed into the first coordinate frame 106 and the estimated state 104 is projected 114 in the first coordinate frame 106 as shown to determine a projected state or position 116 along the previously planned trajectory 112. In some cases, such as the current instance, the projected state or position 116 may be a distance 110 from the position estimate 104 in the first coordinate frame 106 as shown. The projected state 116 is then transformed into the second coordinate frame 108. The vehicle may then plan from the projected state 116 in the second coordinate frame (e.g., the Euclidian coordinate frame) to determine a new planned trajectory 118. Thus, by projecting in the first coordinate frame that is relative to the vehicle's position and then transforming the projected state 116 into the second coordinate frame, the vehicle may plan from a position 116 that is closer to the vehicle, than if a projection between the estimated state 104 and the previously planned trajectory 112 was determined in the second coordinate frame. By having the vehicle plan from a position 116 that is closer to the estimated state 104, the vehicle is better able to plan around nearby obstacles.

The new planned trajectory 118 may then be provided to a tracking system to generate the correction trajectory 120 to compensate for the distance 110 between the projected state 116 and the estimated state 104. Again, since the newly planned trajectory 118 is closer to the estimated state 104 than the previously planned trajectory 112, the correction trajectory 120 generated by the tracking system may be calculated using fewer processing resources and in less time, thereby improving decision and reaction time of the vehicle which ultimately improves the operational safely of the vehicle.

Figure 2:
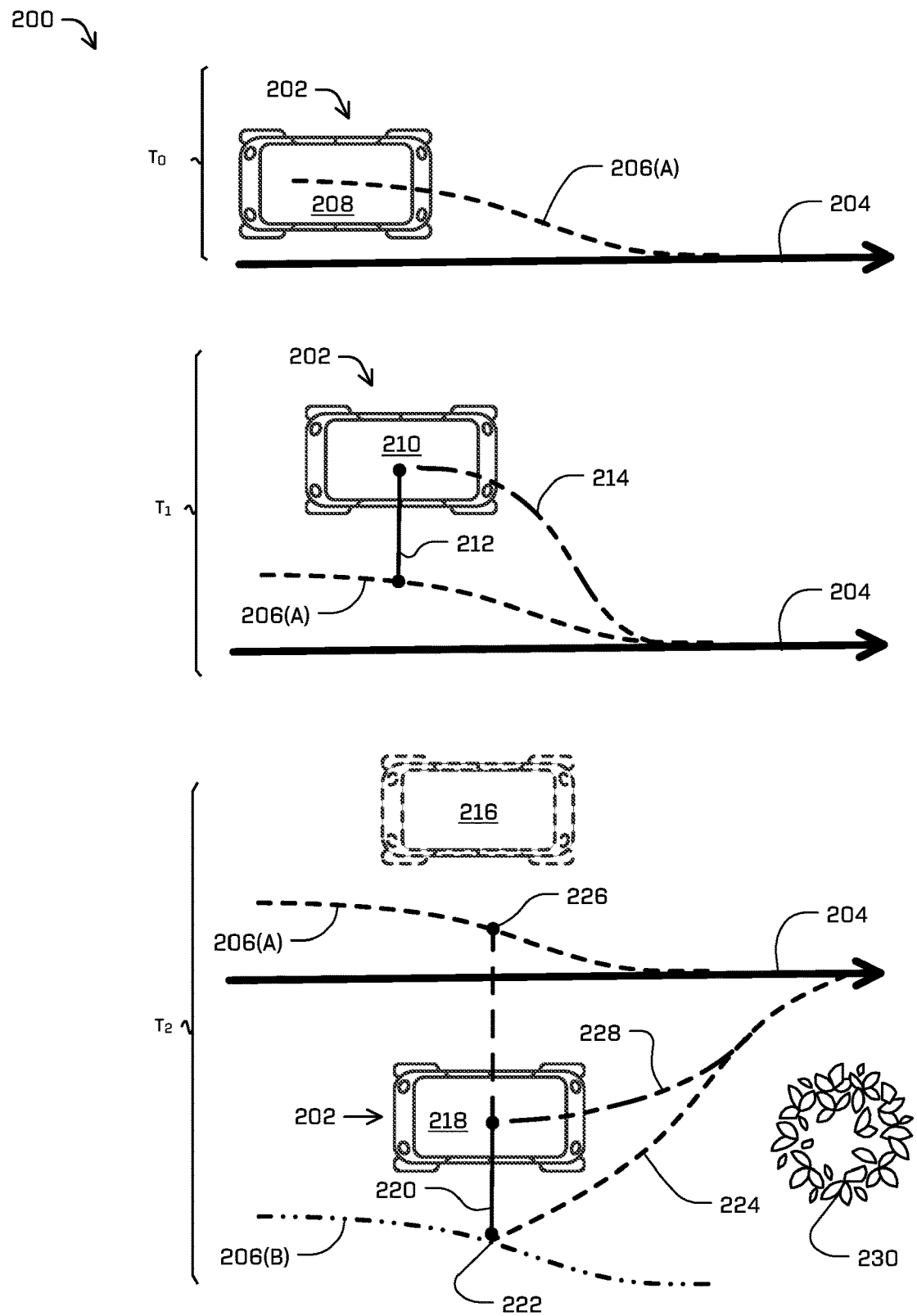
FIG. 2 is an example timing diagram in a Euclidian coordinate system illustrating an autonomous vehicle utilizing a planning architecture, as described herein.

FIG. 2 is an example timing 200 diagram in a Euclidian coordinate system illustrating an autonomous vehicle utilizing a planning architecture, as described herein. In the current example, a vehicle 202 traversing a planned route 204 via a first planned trajectory 206 is shown. For instance, at a first period of time, $t_0$, the vehicle 202 may be at a first position 208 along the first planned trajectory 206(A). As illustrated, such a first planned trajectory 206(A) may be determined in order to promote the vehicle 202 to follow the planned route 204 based on various data (distance from the route 204, obstacles, etc.).

At a second period of time $t_1$, the vehicle 202 may have shifted (e.g., either due to error in the position system (sensor discrepancy, algorithm discrepancy, and/or otherwise) or drift during navigation) to a position 210. Thus, the vehicle 202 may be a first distance 212 from the first planned trajectory 206(A). During the second period of time, the vehicle 202 may generate a first correction trajectory 214 and, thus, have an expected state or position 216, during a third period of time $t_2$.

However, in the current example, during the third period of time, the vehicle 202 is actually at an estimated state 218 not at the expected state 216. In this example, the planning architecture of the vehicle 202 may transform the first planned trajectory 206(A) and the estimated state 218 into the first coordinate frame, causing the first planned trajectory 206(A) to be positioned relative to the vehicle 202 as shown by first transformed planned trajectory 206(B). The vehicle 202 may then perform a projection 220 to determine a projected state 222 along the first planned trajectory 206(A) within the first coordinate frame.

The projected state 222 may then be transferred back into the second coordinate frame at the position shown. The vehicle 202 may then determine a second planned trajectory 224 based on the projected state 222 within the second coordinate frame. Such a second planned trajectory may represent a trajectory for the vehicle 202 to return to the route 204 from the first transformed planned trajectory 206(B) in a similar fashion as if the planning had been performed at the first transformed trajectory 206(A). In this manner, the current planning process allows the vehicle 202 to determine the second planned trajectory 224 from the projected state 222 that is closer to the estimated state 218 of the vehicle 202 than the position 226 along the first planned trajectory 206(A) thereby improving safety over convectional planning systems. For instance, as shown an object 230 (e.g., the tree) may be in the path of the vehicle 202 but would not be accommodated for in a planned trajectory (not shown) determined from position 226, but is easily avoided in the current process, described herein.

In some instances, such as the illustrated example, the vehicle 202 may still be offset or may be a distance from the second planned trajectory 224. In these cases, the vehicle 202 may determine a correction trajectory 228 to bring the vehicle 202 closer to or onto the planned trajectory 224. Again, since the planned trajectory 224 is physical closer to the estimated state 218, the calculations to determine the correction trajectory 228 are reduced and, as such, reduce time periods associated with decision and planning, thereby improving overall safety of the vehicle 202.

Figure 3:
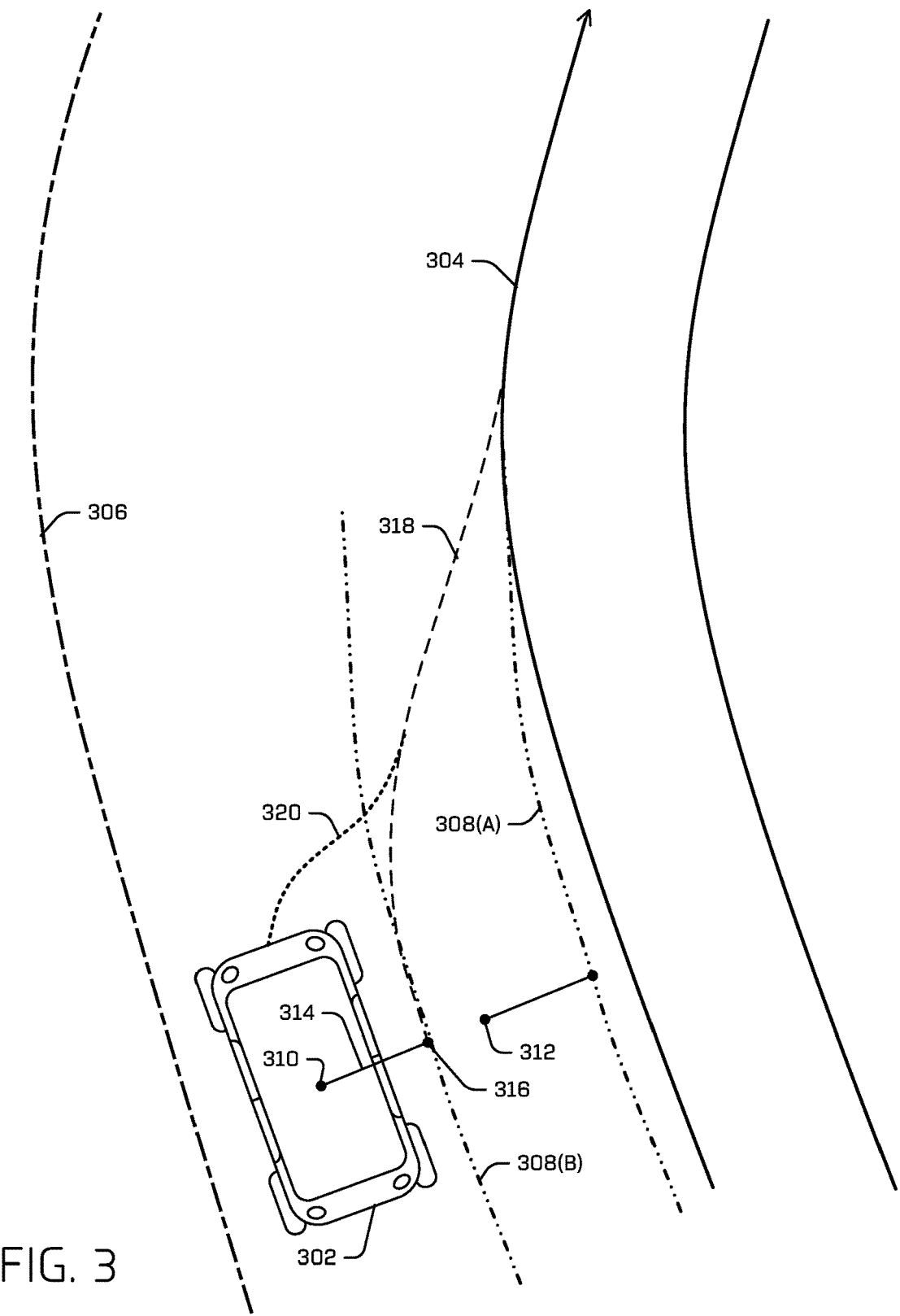
FIG. 3 is an example pictorial diagram of an autonomous vehicle utilizing a planning architecture, as described herein.

FIG. 3 is an example pictorial diagram 300 of an autonomous vehicle 302 utilizing a planning architecture, described above with respect to FIGS. 1 and 2. In the current example, the vehicle 302 is traveling within a planned path or route 304 having a route reference 306 (e.g., a side or center of a lane). The vehicle 302 also has a previous planned trajectory 308(A) in the second coordinate system (e.g., within the Euclidian coordinate frame illustrated in FIG. 3). In the current example, the previous planned trajectory 308(A) may be in the form of an arc (e.g., the vehicle 302 is not moving in a straight line as in FIGS. 1 and 2). As discussed above, an actual state of the vehicle 302 (position, velocity, yaw, heading, etc.) represented by 310 may differ from an expected state 312, which may also be offset from the planned trajectory 308(A) as shown.

In this example, the previously planned trajectory 308(A) may be transformed into the first coordinate frame (e.g., the vehicle or body-centric coordinate frame) as shown as previously planned trajectory 308(B). It should be noted, that as FIG. 3 is shown in the second coordinate frame and the previously planned trajectory 308(B) in the first coordinate frame, the location of the previously planned trajectory 308(B) relative to the estimated state reflects the position of the previously planned trajectory 308(A) relative to the expected state 312 of the vehicle 302.

The vehicle 302 may then project the estimated state 310 onto the previous planned trajectory 308(B), generally indicated by projection 314, to identify the projected state 316. In some cases, such as the illustrated example, the projection 314 is based on a shortest distance between the estimated state 310 of the vehicle 302 and the previous decision trajectory 308(B). The projected state 316 may then transformed into the second coordinate frame using transformations determined with respect the state of the vehicle during a current period of time. The vehicle 302 may then determine a new planned trajectory 318 starting from the projected state 316 in the second coordinate frame and returning the vehicle 302 to the planned path 304, as shown. However, in some cases, the vehicle 302 may still be offset from the new planned trajectory 318. In these cases, the vehicle 302, or a tracking system of the vehicle 302, may determine a correction trajectory 320 to bring the vehicle 302 onto the planned trajectory 318. Again, since the planned trajectory 308(B) is physical closer to the estimated state 310, the calculations to determine the correction trajectory 320 are reduced and, as such, reduce time periods associated with decision and planning, thereby improving overall safety of the vehicle 302.

In the examples, above the estimated state 310 of the vehicle 202 is shown as at the midpoint of the vehicle 302, however, the point 310 may be at any fixed position on the vehicle 302. For example, the point 310 may be along the front or rear axle as well as other positions.

Figure 4:
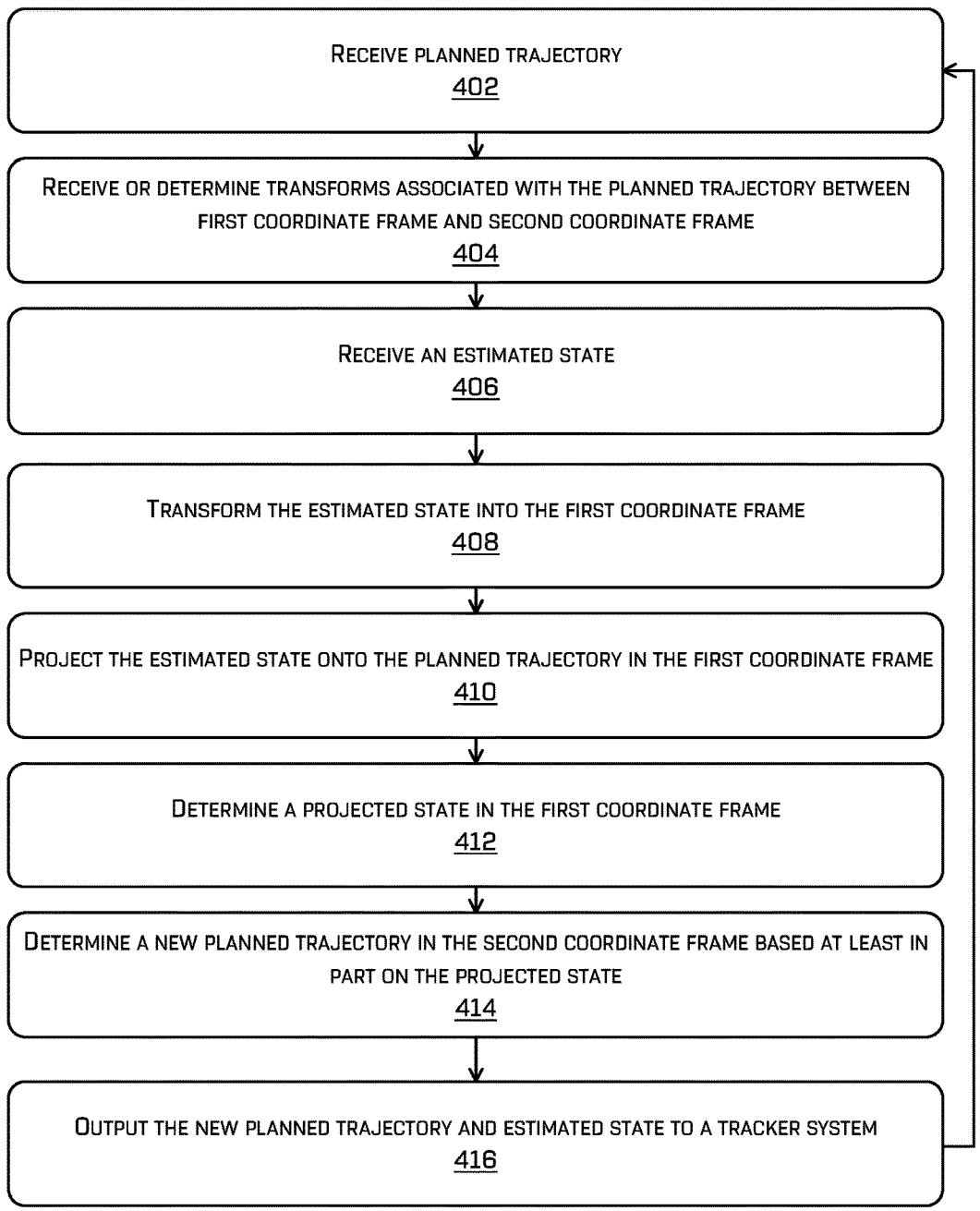
FIG. 4 is a flow diagram illustrating an example process associated with the planning architecture, as described herein.

FIG. 4 is a flow diagram illustrating example process 400 associated with the planning architecture according to some implementations. The processes are illustrated as a collection of blocks in a logical flow diagram, which represent a sequence of operations, some or all of which can be implemented in hardware, software, or a combination thereof. In the context of software, the blocks represent computer-executable instructions stored on one or more computer-readable media that, which when executed by one or more processors, perform the recited operations. Generally, computer-executable instructions include routines, programs, objects, components, encryption, deciphering, compressing, recording, data structures and the like that perform particular functions or implement particular abstract data types.

The order in which the operations are described should not be construed as a limitation. Any number of the described blocks can be combined in any order and/or in parallel to implement the processes, or alternative processes, and not all of the blocks need be executed. For discussion purposes, the processes herein are described with reference to the frameworks, architectures and environments described in the examples herein, although the processes may be implemented in a wide variety of other frameworks, architectures or environments.

As discussed above, in some instances, an estimated state of an autonomous vehicle may move or jump due to changes in data received from various position sensors. The jumps in estimated state may result in back and forth or jerky movement of the vehicle without proper compensation by the planning architecture or systems of the vehicle.

FIG. 4 is a flow diagram illustrating an example process 400 associated with the planning architecture, as described herein. The process 400 may be used by, for instance, an autonomous vehicle to compensate for differences between an estimated state and a planned path by projecting the estimated state on to a planned trajectory within a first (body-centric) coordinate frame and then converting the projected state into the second (e.g., Euclidian) coordinate frame prior to the tracking system generating the correction trajectory.

At 402, the system may receive or access a planned trajectory. In some cases, the planned trajectory may be associated with a previous period of time. The planned trajectory may be in the first coordinate frame, the second coordinate frame, or both.

At 404, the system may receive or determine transforms associated with the planned trajectory between the first coordinate frame and a second coordinate frame. In some cases, the transforms may be determined during a previous period of time, such as during the period of time in which the planned trajectory was determined. In some examples, the transforms may be stored at a location that is accessible by the systems of the planning architecture.

At 406, the system may receive an estimated state. The estimated state may be received from one or more position sensors or systems associated with the position sensors. For example, the position sensors may include an inertial measurement unit (IMU), Global Position System (GPS) sensors or Global Navigation Satellite System (GNSS) sensors as well as other types of position sensors. In some examples, the position may be estimated based on captured image, lidar, or radar data of a physical environment surrounding the vehicle as well as one or more stored environment maps. For example, the operation 406 may include localizing a vehicle in an environment based on a captured data (e.g., lidar, radar, image) with respect to a map (e.g., a mesh or data structure comprising multi-resolution covariance data). The estimated state may be within the second coordinate frame.

At 408, the system may transform the estimated state into the first coordinate frame (e.g., the body-centric coordinate frame). Thus, the estimated state and the planned trajectory may be compared within the first coordinate frame. Additionally, it should be understood, that as the first coordinate frame is relative to the vehicle, a position of the vehicle does not move even with the corresponding jump in the estimated state.

At 410, the system may project the estimated state onto the planned trajectory in the first coordinate frame. For example, as discussed above with respect to FIGS. 1-3, the system may project the estimated state onto the planned trajectory by determining a shortest distance between the planned trajectory and the estimated state.

At 412, the system may determine a projected state in the first coordinate frame. For example, the position on the planned trajectory that is the shortest distance from the estimated state may be selected or used as the projected state.

At 414, the system may then determine a new planned trajectory in the second coordinate frame based at least in part on the projected state. For example, the system may determine a new trajectory to return the vehicle from the projected state to the planned path accommodating for any nearby objects.

At 416, the system may output the new planned trajectory and the estimated state to a tracker system. For example, some offset between the estimated state and the new planned trajectory may still exist, as the new planned trajectory is determined from the projected state. In these cases, the tracker system may determine a correction trajectory between the estimated state and the new planned trajectory that avoids any nearby objects, as discussed above.

Figure 5:
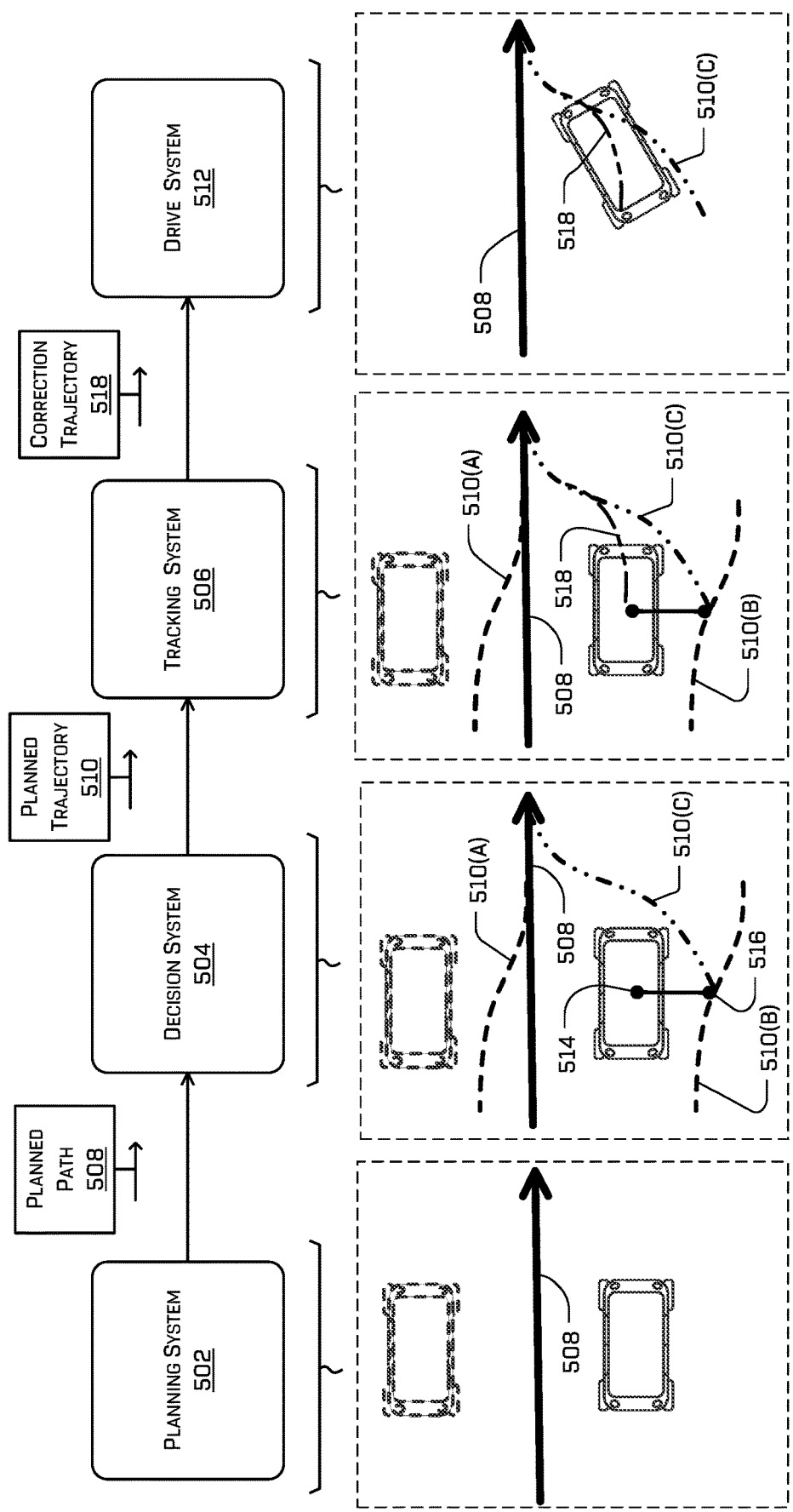
FIG. 5 is a block diagram illustrating an example planning architecture, as described herein.

FIG. 5 is a block diagram illustrating an example planning architecture 500, as described herein. In the current example, the planning architecture 500 may include a planning system 502, a decision system 504, and a tracking system 506. The planning system 502 may generate a planned path 508 for the vehicle from a first location to a second location. The decision system 504 may maintain, adjust, or generate planned trajectories, such as planned trajectories 510(A) and 510(B), of the vehicle based on the planned path 508 and an estimated state 514 of the vehicle taking into account any objects that may be proximate to the vehicle. For example, the decision system 504 may receive the estimated state 514 of the vehicle and project the estimated state 514 onto a previously planned trajectory 510(A) to determine a projection position 516, as discussed above. The decision system 504 may then generate a new planned trajectory 510(C) based on the projected state 516 and the planned path 508 as shown. The tracking system 506 may generate correction trajectories 518 to be followed by a drive system 512 to compensate for variances between the planned path 508 and the planned trajectory 510(C) (e.g., to assist with keeping the vehicle on the planned trajectory 510(C).

Figure 6:
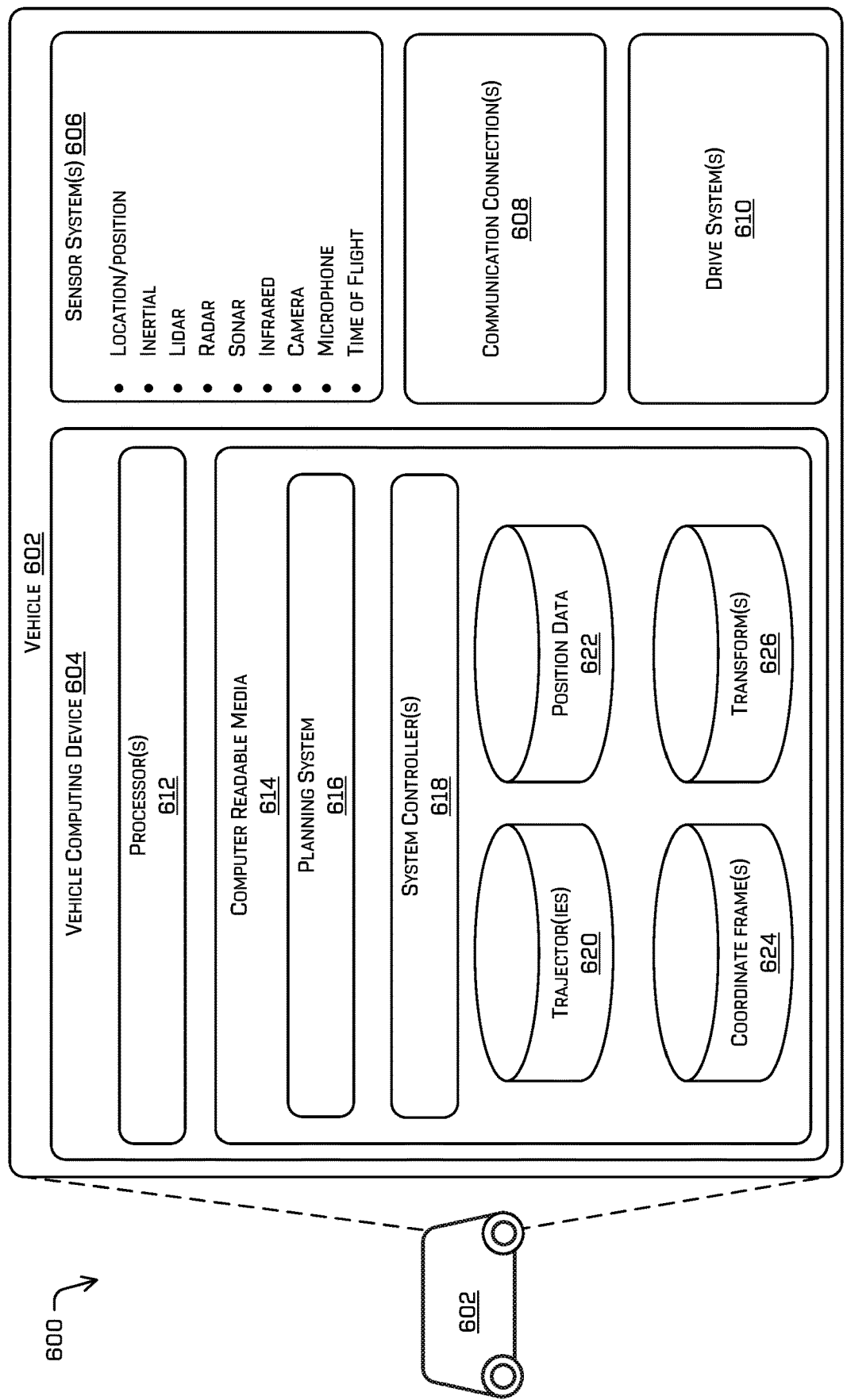
FIG. 6 is a pictorial diagram illustrating an example implementation of the planning system in an autonomous vehicle, as described herein.

FIG. 6 is a block diagram of an example system 600 for implementing the techniques described herein, in accordance with embodiments of the disclosure. In some examples, the system 600 may include one or multiple features, components, and/or functionality of embodiments described herein with reference to FIGS. 1-5. In some embodiments, the system 600 may include a vehicle 602. The vehicle 602 may include a vehicle computing device 604, one or more sensor systems 606, one or more communication connections 608, and one or more drive systems 610.

The vehicle computing device 604 may include one or more processors 612 and computer readable media 614 communicatively coupled with the one or more processors 612. In the illustrated example, the vehicle 602 is an autonomous vehicle; however, the vehicle 602 could be any other type of vehicle, or any other system (e.g., a robotic system, a camera enabled smartphone, etc.). In the illustrated example, the computer readable media 614 of the vehicle computing device 604 stores a planning system 616 and system controllers 618 as well as trajectories 620, position data 622, coordinate frames 624, and transforms 626 between the coordinate frames 624. Though depicted in FIG. 6 as residing in computer readable media 614 for illustrative purposes, it is contemplated that the planning system 616 and the system controllers 618 as well as the trajectories 620, the position data 622, the coordinate frames 624, and the transforms 626 may additionally, or alternatively, be accessible to the vehicle 602 (e.g., stored on, or otherwise accessible by, computer readable media remote from the vehicle 602).

In at least one example, the planning system 616 may be configured to implement one or more processes for compensating for deviations between measured and desired states of the vehicle as described with respect to any of FIGS. 1-5 herein.

In at least one example, the vehicle computing device 604 can include one or more system controllers 618, which can be configured to control steering, propulsion, braking, safety, emitters, communication, and other systems of the vehicle 602. These system controller(s) 618 may communicate with and/or control corresponding systems of the drive system(s) 610 and/or other components of the vehicle 602. In some instances, aspects of some or all of the components discussed herein can include any models, algorithms, and/or machine learning algorithms.

In at least one example, the sensor system(s) 606 can include lidar sensors, radar sensors, ultrasonic transducers, sonar sensors, location sensors (e.g., GPS, compass, etc.), inertial sensors (e.g., inertial measurement units (IMUs), accelerometers, magnetometers, gyroscopes, etc.), cameras (e.g., RGB, IR, intensity, depth, time of flight, etc.), microphones, wheel encoders, environment sensors (e.g., temperature sensors, humidity sensors, light sensors, pressure sensors, etc.), and one or more time of flight (ToF) sensors, etc. The sensor system(s) 606 can include multiple instances of each of these or other types of sensors. For instance, the lidar sensors may include individual lidar sensors located at the corners, front, back, sides, and/or top of the vehicle 602. As another example, the camera sensors can include multiple cameras disposed at various locations about the exterior and/or interior of the vehicle 602. The sensor system(s) 606 may provide input to the vehicle computing device 604. Additionally, or alternatively, the sensor system(s) 606 can send sensor data, via the one or more networks, to the one or more computing device(s) at a particular frequency, after a lapse of a predetermined period of time, in near real-time, etc.

The vehicle 602 can also include one or more communication connection(s) 608 that enable communication between the vehicle 602 and one or more other local or remote computing device(s). For instance, the communication connection(s) 608 may facilitate communication with other local computing device(s) on the vehicle 602 and/or the drive system(s) 610. Also, the communication connection(s) 608 may allow the vehicle 602 to communicate with other nearby computing device(s) (e.g., other nearby vehicles, traffic signals, etc.). The communications connection(s) 608 also enable the vehicle 602 to communicate with remote teleoperations computing device or other remote services.

The communications connection(s) 608 may include physical and/or logical interfaces for connecting the vehicle computing device 604 to another computing device (e.g., computing device(s) 630) and/or a network, such as network(s) 628. For example, the communications connection(s) 608 may enable Wi-Fi-based communication such as via frequencies defined by the IEEE 802.11 standards, short range wireless frequencies such as Bluetooth®, cellular communication (e.g., 2G, 3G, 4G, 4G LTE, 5G, etc.) or any suitable wired or wireless communications protocol that enables the respective computing device to interface with the other computing device(s).

In at least one example, the vehicle 602 can include one or more drive systems 610. In some examples, the vehicle 602 may have a single drive system 610. In at least one example, if the vehicle 602 has multiple drive systems 610, individual drive systems 610 can be positioned on opposite ends of the vehicle 602 (e.g., the front and the rear, etc.). In at least one example, the drive system(s) 610 can include one or more sensor systems 606 to detect conditions of the drive system(s) 610 and/or the surroundings of the vehicle 602, as discussed above. By way of example and not limitation, the sensor system(s) 606 can include one or more wheel encoders (e.g., rotary encoders) to sense rotation of the wheels of the drive systems, inertial sensors (e.g., inertial measurement units, accelerometers, gyroscopes, magnetometers, etc.) to measure orientation and acceleration of the drive system, cameras or other image sensors, ultrasonic sensors to acoustically detect objects in the surroundings of the drive system, lidar sensors, radar sensors, etc. Some sensors, such as the wheel encoders may be unique to the drive system(s) 610. In some cases, the sensor system(s) 606 on the drive system(s) 610 can overlap or supplement corresponding systems of the vehicle 602.

In at least one example, the components discussed herein can process sensor data, such as position data 622, as described above, and may send their respective outputs, over the one or more network(s) 628, to one or more computing device(s) 630. In at least one example, the components discussed herein may send their respective outputs to the one or more computing device(s) 630 at a particular frequency, after a lapse of a predetermined period of time, in near real-time, etc.

As described herein, an exemplary neural network is a biologically inspired algorithm which passes input data through a series of connected layers to produce an output. Each layer in a neural network can also comprise another neural network or can comprise any number of layers (whether convolutional or not). As can be understood in the context of this disclosure, a neural network can utilize machine learning, which can refer to a broad class of such algorithms in which an output is generated based on learned parameters.

Although discussed in the context of neural networks, any type of machine learning can be used consistent with this disclosure. For example, machine learning algorithms can include, but are not limited to, regression algorithms (e.g., ordinary least squares regression (OLSR), linear regression, logistic regression, stepwise regression, multivariate adaptive regression splines (MARS), locally estimated scatterplot smoothing (LOESS)), instance-based algorithms (e.g., ridge regression, least absolute shrinkage and selection operator (LASSO), elastic net, least-angle regression (LARS)), decisions tree algorithms (e.g., classification and regression tree (CART), iterative dichotomiser 3 (ID3), Chi-squared automatic interaction detection (CHAID), decision stump, conditional decision trees), Bayesian algorithms (e.g., naïve Bayes, Gaussian naïve Bayes, multinomial naïve Bayes, average one-dependence estimators (AODE), Bayesian belief network (BNN), Bayesian networks), clustering algorithms (e.g., k-means, k-medians, expectation maximization (EM), hierarchical clustering), association rule learning algorithms (e.g., perceptron, back-propagation, hopfield network, Radial Basis Function Network (RBFN)), deep learning algorithms (e.g., Deep Boltzmann Machine (DBM), Deep Belief Networks (DBN), Convolutional Neural Network (CNN), Stacked Auto-Encoders), Dimensionality Reduction Algorithms (e.g., Principal Component Analysis (PCA), Principal Component Regression (PCR), Partial Least Squares Regression (PLSR), Sammon Mapping, Multidimensional Scaling (MDS), Projection Pursuit, Linear Discriminant Analysis (LDA), Mixture Discriminant Analysis (MDA), Quadratic Discriminant Analysis (QDA), Flexible Discriminant Analysis (FDA)), Ensemble Algorithms (e.g., Boosting, Bootstrapped Aggregation (Bagging), AdaBoost, Stacked Generalization (blending), Gradient Boosting Machines (GBM), Gradient Boosted Regression Trees (GBRT), Random Forest), SVM (support vector machine), supervised learning, unsupervised learning, semi-supervised learning, etc. Additional examples of architectures include neural networks such as ResNet50, ResNet101, VGG, DenseNet, PointNet, and the like.

The processor(s) 612 of the vehicle 602 and the processor(s) 632 of the computing device(s) 630 may be any suitable processor capable of executing instructions to process data and perform operations as described herein. By way of example and not limitation, the processor(s) 612 and 632 can comprise one or more Central Processing Units (CPUs), Graphics Processing Units (GPUs), or any other device or portion of a device that processes electronic data to transform that electronic data into other electronic data that can be stored in registers and/or computer readable media. In some examples, integrated circuits (e.g., ASICs, etc.), gate arrays (e.g., FPGAs, etc.), and other hardware devices can also be considered processors in so far as they are configured to implement encoded instructions.

Computer readable media 614 and 634 are examples of non-transitory computer-readable media. The computer readable media 614 and 634 can store an operating system and one or more software applications, instructions, programs, and/or data to implement the methods described herein and the functions attributed to the various systems. In various implementations, the computer readable media can be implemented using any suitable computer readable media technology, such as static random access memory (SRAM), synchronous dynamic RAM (SDRAM), nonvolatile/Flash-type memory, or any other type of computer readable media capable of storing information. The architectures, systems, and individual elements described herein can include many other logical, programmatic, and physical components, of which those shown in the accompanying figures are merely examples that are related to the discussion herein.

As can be understood, the components discussed herein are described as divided for illustrative purposes. However, the operations performed by the various components can be combined or performed in any other component.

It should be noted that while FIG. 6 is illustrated as a distributed system, in alternative examples, components of the vehicle 602 can be associated with the computing device(s) 630 and/or components of the computing device(s) 630 can be associated with the vehicle 602. That is, the vehicle 602 can perform one or more of the functions associated with the computing device(s) 630, and vice versa. Further, aspects of machine learning component 638 can be performed on any of the devices discussed herein.

Example Clauses

A. An autonomous vehicle comprising: one or more position sensors; one or more processors; and one or more non-transitory computer readable media storing instructions executable by the one or more processors, wherein the instruction, when executed, cause the one or more processors to perform operations comprising: receiving an estimated position associated with the autonomous vehicle; determining a projected position of the autonomous vehicle by determining a relative position of the estimated position associated with the autonomous vehicle with respect to a previously planned trajectory of the vehicle within a vehicle body-centric coordinate frame; determining, based at least in part on a Euclidian coordinate frame, a new planned trajectory associated with the autonomous vehicle based at least in part on the projected position and a planned path associated with the autonomous vehicle, the planned path comprising a route for the autonomous vehicle between a first location and a second location; determining, based at least in part on the Euclidian coordinate frame, a correction trajectory associated with the autonomous vehicle based at least in part on the estimated position associated with the autonomous vehicle and the new planned trajectory; and controlling operations of the autonomous vehicle based at least in part on the correction trajectory.

B. The autonomous vehicle of claim A, wherein the correction trajectory is further based at least in part on a location of an object proximate to the autonomous vehicle.

C. The autonomous vehicle of claim A, further comprising transforming the projected position from the vehicle body-centric coordinate frame to the Euclidian coordinate frame prior to determining the new planned trajectory.

D. The autonomous vehicle of claim A, wherein controlling operations of the autonomous vehicle comprises causing the autonomous vehicle to traverse the correction trajectory.

E. A method comprising: determining a projected state of an autonomous vehicle by projecting, within a first coordinate frame, a measured state associated with the autonomous vehicle onto a first planned trajectory of the autonomous vehicle; determining, based at least in part on a second coordinate frame, a second planned trajectory associated with the autonomous vehicle based at least in part on the projected state and a planned path associated with the autonomous vehicle; and controlling operations of the autonomous vehicle based at least in part on the second planned trajectory.

F. The method of paragraph E, wherein the measured state comprises at least one of a measured position, a measured orientation, a measured acceleration, or a measured velocity associated with the autonomous vehicle.

G. The method of paragraph E, wherein the first coordinate frame is a vehicle body-centric coordinate frame and the second coordinate frame is an Euclidian coordinate frame.

H. The method of paragraph E, wherein the second planned trajectory is further based at least in part on a state of an object detected by the autonomous vehicle.

I. The method of paragraph E, wherein determining the projected state comprises determining a shortest distance between the first planned trajectory and the measured state.

J. The method of paragraph E, further comprising: determining, based at least in part on the second coordinate frame, a correction trajectory associated with the autonomous vehicle based at least in part on the measured state associated with the autonomous vehicle and the second planned trajectory; and wherein controlling operations of the autonomous vehicle is based at least in part on the correction trajectory.

K. The method of paragraph J, wherein: the correction trajectory is further based at least in part on a state of an object detected by the autonomous vehicle.

L. The method of paragraph E, wherein the second planned trajectory, when executed by the autonomous vehicle, causes the autonomous vehicle to return to the planned path.

M. A non-transitory computer-readable medium storing instructions that, when executed, cause one or more processors to perform operations comprising: determining a projected state of an autonomous vehicle by projecting, based at least in part on a first coordinate frame, a measured state associated with the autonomous vehicle onto a first planned trajectory of the vehicle; determining, based at least in part on a second coordinate frame, a second planned trajectory associated with the autonomous vehicle based at least in part on the projected state and a planned path associated with the autonomous vehicle, the planned path comprising a route for the autonomous vehicle between a first location and a second location; and determining, with the second coordinate frame, a correction trajectory associated with the autonomous vehicle based at least in part on the measured state associated with the autonomous vehicle and the second planned trajectory.

N. The non-transitory computer-readable medium of paragraph M, wherein determining the projected state comprises determining a shortest distance between the first planned trajectory and the measured state.

O. The non-transitory computer-readable medium of paragraph M, wherein the first coordinate frame is a relative to the body of the vehicle.

P. The non-transitory computer-readable medium of paragraph M, wherein the second coordinate frame is a Universal Transverse Mercator (UTM) coordinate frame.

Q. The non-transitory computer-readable medium of paragraph M, further comprising controlling operations of the autonomous vehicle based at least in part on the correction trajectory.

R. The non-transitory computer-readable medium of paragraph S, determining a correction trajectory associated with the autonomous vehicle based at least in part on the measured state associated with the autonomous vehicle and the second planned trajectory; and wherein controlling operations of the autonomous vehicle is based at least in part on the correction trajectory.

S. The non-transitory computer-readable medium of paragraph R, wherein the correction trajectory is determined based at least in part on the second coordinate frame.

T. The non-transitory computer-readable medium of paragraph R, wherein the correction trajectory, when executed by the autonomous vehicle, causes the autonomous vehicle to return to the second planned trajectory.

While the example clauses described above are described with respect to one particular implementation, it should be understood that, in the context of this document, the content of the example clauses can also be implemented via a method, device, system, a computer-readable medium, and/or another implementation. Additionally, any of examples A-T may be implemented alone or in combination with any other one or more of the examples A-T.

CONCLUSION

As can be understood, the components discussed herein are described as divided for illustrative purposes. However, the operations performed by the various components can be combined or performed in any other component. It should also be understood, that components or steps discussed with respect to one example or implementation may be used in conjunction with components or steps of other examples. For example, the components and instructions of FIG. 6 may utilize the processes and flows of FIGS. 1-5.

While one or more examples of the techniques described herein have been described, various alterations, additions, permutations and equivalents thereof are included within the scope of the techniques described herein.

In the description of examples, reference is made to the accompanying drawings that form a part hereof, which show by way of illustration specific examples of the claimed subject matter. It is to be understood that other examples can be used and that changes or alterations, such as structural changes, can be made. Such examples, changes or alterations are not necessarily departures from the scope with respect to the intended claimed subject matter. While the steps herein can be presented in a certain order, in some cases the ordering can be changed so that certain inputs are provided at different times or in a different order without changing the function of the systems and methods described. The disclosed procedures could also be executed in different orders. Additionally, various computations described herein need not be performed in the order disclosed, and other examples using alternative orderings of the computations could be readily implemented. In addition to being reordered, in some instances, the computations could also be decomposed into sub-computations with the same results.

What is claimed is:

1. An autonomous vehicle comprising:
    one or more position sensors;
    one or more processors; and
    one or more non-transitory computer readable media storing instructions executable by the one or more processors, wherein the instructions, when executed, cause the one or more processors to perform operations comprising:
        receiving an estimated position associated with the autonomous vehicle;
        determining, based at least in part on the estimated position, a projected position of the autonomous vehicle along a previously planned trajectory of the autonomous vehicle within a vehicle body-centric coordinate frame, the estimated position deviating from the previously planned trajectory by an arc-length along the previously planned trajectory and an offset extending from the previously planned trajectory;
        determining, based at least in part on a Euclidian coordinate frame parameterized in Cartesian coordinates, the projected position, and a planned path associated with the autonomous vehicle comprising a route for the autonomous vehicle between a first location and a second location, a new planned trajectory associated with the autonomous vehicle;
        determining, based at least in part on the Euclidian coordinate frame, a correction trajectory associated with the autonomous vehicle based at least in part on the estimated position associated with the autonomous vehicle and the new planned trajectory, the correction trajectory configured to cause the autonomous vehicle to traverse from the estimated position; and
        controlling operations of the autonomous vehicle based at least in part on the correction trajectory.

2. The autonomous vehicle of claim 1, wherein the correction trajectory is further based at least in part on a location of an object proximate to the autonomous vehicle.

3. The autonomous vehicle of claim 1, further comprising transforming the projected position from the vehicle body-centric coordinate frame to the Euclidian coordinate frame prior to determining the new planned trajectory.

4. The autonomous vehicle of claim 1, wherein controlling the operations of the autonomous vehicle comprises causing the autonomous vehicle to traverse the correction trajectory.

5. A method comprising:
    determining, based on at least on a measured state associated with an autonomous vehicle, a projected state of the autonomous vehicle along a first planned trajectory of the autonomous vehicle within a first coordinate frame, the measured state deviating from the first planned trajectory by an arc-length along the first planned trajectory and an offset extending from the first planned trajectory;
    determining, based at least in part on a second coordinate frame parameterized in Cartesian coordinates, the projected state, and a planned path associated with the autonomous vehicle, a second planned trajectory associated with the autonomous vehicle; and
    controlling operations of the autonomous vehicle based at least in part on the second planned trajectory.

6. The method of claim 5, wherein the measured state comprises at least one of a measured position, a measured orientation, a measured acceleration, or a measured velocity associated with the autonomous vehicle.

7. The method of claim 5, wherein the first coordinate frame is a vehicle body-centric coordinate frame and the second coordinate frame is an Euclidian coordinate frame.

8. The method of claim 7, wherein the second planned trajectory is further based at least in part on a state of an object detected by the autonomous vehicle.

9. The method of claim 5, wherein determining the projected state comprises determining a shortest distance between the first planned trajectory and the measured state.

10. The method of claim 5, further comprising:
    determining, based at least in part on the second coordinate frame, a correction trajectory associated with the autonomous vehicle based at least in part on the measured state associated with the autonomous vehicle and the second planned trajectory; and
    wherein controlling the operations of the autonomous vehicle is based at least in part on the correction trajectory.

11. The method of claim 10, wherein the correction trajectory is further based at least in part on a state of an object detected by the autonomous vehicle.

12. The method of claim 5, wherein the second planned trajectory, when executed by the autonomous vehicle, causes the autonomous vehicle to return to the planned path.

13. One or more non-transitory computer-readable media storing instructions that, when executed, cause one or more processors to perform operations comprising:
    determining, based on at least on a measured state associated with an autonomous vehicle, a projected state of the autonomous vehicle by along a first planned trajectory of the autonomous vehicle within a first coordinate frame, the measured state deviating from the first planned trajectory by an arc-length along the first planned trajectory and an offset extending from the first planned trajectory;
    determining, based at least in part on a second coordinate frame parameterized in Cartesian coordinates, the projected state, and a planned path associated with the autonomous vehicle, a second planned trajectory associated with the autonomous vehicle; and
    determining, with the second coordinate frame, a correction trajectory associated with the autonomous vehicle based at least in part on the measured state associated with the autonomous vehicle and the second planned trajectory, the correction trajectory configured to cause the autonomous vehicle to traverse from the measured state.

14. The one or more non-transitory computer-readable media of claim 13, wherein determining the projected state comprises determining a shortest distance between the first planned trajectory and the measured state.

15. The one or more non-transitory computer-readable media of claim 13, wherein the first coordinate frame is relative to a body of the autonomous vehicle.

16. The one or more non-transitory computer-readable media of claim 13, wherein the second coordinate frame is a Universal Transverse Mercator (UTM) coordinate frame.

17. The one or more non-transitory computer-readable media of claim 13, further comprising controlling operations of the autonomous vehicle based at least in part on the correction trajectory.

18. The one or more non-transitory computer-readable media of claim 13, wherein the correction trajectory is determined based at least in part on the second coordinate frame.

19. The one or more non-transitory computer-readable media of claim 13, wherein the correction trajectory, when executed by the autonomous vehicle, causes the autonomous vehicle to return to the second planned trajectory.

20. The one or more non-transitory computer-readable media of claim 13, wherein the correction trajectory is further based at least in part on a state of an object detected by the autonomous vehicle.

\* \* \* \* \*